United States Patent
Phillips

(10) Patent No.: US 9,699,874 B2
(45) Date of Patent: Jul. 4, 2017

(54) SYSTEM, METHOD, AND APPARATUS FOR SELF-ADAPTIVE SCHEDULED LIGHTING CONTROL

(71) Applicant: Jonathan Richard Phillips, Chicago, IL (US)

(72) Inventor: Jonathan Richard Phillips, Chicago, IL (US)

(*) Notice: Subject to any disclaimer, the term of this patent is extended or adjusted under 35 U.S.C. 154(b) by 0 days.

(21) Appl. No.: 14/851,976

(22) Filed: Sep. 11, 2015

(65) Prior Publication Data

US 2016/0081161 A1    Mar. 17, 2016

Related U.S. Application Data

(60) Provisional application No. 62/049,754, filed on Sep. 12, 2014.

(51) Int. Cl.
*H05B 37/02*    (2006.01)

(52) U.S. Cl.
CPC ..... *H05B 37/0281* (2013.01); *H05B 37/0218* (2013.01); *H05B 37/0227* (2013.01);
(Continued)

(58) Field of Classification Search
CPC .............. H05B 37/029; H05B 37/0218; H05B 37/0227; H05B 37/0236; H05B 37/0254; H05B 37/0272; H05B 37/0209
See application file for complete search history.

(56) References Cited

U.S. PATENT DOCUMENTS

| 2006/0116791 A1* | 6/2006 | Ravula | A01G 25/16 700/284 |
|---|---|---|---|
| 2007/0273307 A1* | 11/2007 | Westrick | H05B 37/0218 315/312 |

(Continued)

FOREIGN PATENT DOCUMENTS

| WO | 2013/088312 | 6/2013 |
|---|---|---|
| WO | 2014/001965 | 1/2014 |

(Continued)

OTHER PUBLICATIONS

International Search Report, dated Feb. 3, 2016, issued in corresponding International Application No. PCT/US2015/049944.

*Primary Examiner* — Tung X Le
*Assistant Examiner* — Raymond R Chai
(74) *Attorney, Agent, or Firm* — Scott D. Barnett; Harness, Dickey & Pierce, P.L.C.

(57) ABSTRACT

A lighting control device is provided which includes a microcontroller, at least one wireless transceiver, at least one dimmer, one or more lighting terminals powered by the at least one dimmer, at least one environmental sensor, and at least one input device. In operation, the microcontroller obtains environmental data from the at least one environmental sensor, obtains input data from the at least one input device, transmits the environmental data and the input data to an external server, obtains a lighting operating schedule based on the environmental data and the input data from the external server, and executes the lighting operating schedule from the external server by controlling one or more smart bulbs via the at least one wireless transceiver and controlling the electrical current output to lighting terminals.

20 Claims, 7 Drawing Sheets

(52) U.S. Cl.
  CPC ...... *H05B 37/0236* (2013.01); *H05B 37/0254* (2013.01); *H05B 37/0272* (2013.01); *Y02B 20/42* (2013.01); *Y02B 20/48* (2013.01)

(56) References Cited

U.S. PATENT DOCUMENTS

| | | | | |
|---|---|---|---|---|
| 2008/0265799 | A1* | 10/2008 | Sibert | H05B 37/0245 |
| | | | | 315/292 |
| 2012/0038281 | A1* | 2/2012 | Verfuerth | H05B 37/0272 |
| | | | | 315/152 |
| 2013/0140995 | A1 | 6/2013 | Jones | |
| 2013/0193876 | A1* | 8/2013 | Cleland | H05B 37/0245 |
| | | | | 315/297 |
| 2013/0257289 | A1* | 10/2013 | Vanwagoner | H05B 37/0209 |
| | | | | 315/152 |
| 2013/0285556 | A1* | 10/2013 | Challapali | H05B 37/0245 |
| | | | | 315/130 |
| 2014/0101082 | A1 | 4/2014 | Matsuoka et al. | |
| 2014/0180491 | A1* | 6/2014 | Verfuerth | H05B 37/0209 |
| | | | | 700/295 |
| 2014/0289388 | A1* | 9/2014 | Ghosh | H04L 41/0893 |
| | | | | 709/223 |
| 2014/0339985 | A1* | 11/2014 | Engelen | G06F 3/0421 |
| | | | | 315/151 |
| 2015/0264776 | A1* | 9/2015 | Amarin | G06Q 10/0875 |
| | | | | 315/129 |

FOREIGN PATENT DOCUMENTS

| | | | | |
|---|---|---|---|---|
| WO | 2014/051632 | 4/2014 | | |
| WO | WO 2014051632 A1 * | 4/2014 | | F24F 11/0034 |

\* cited by examiner

SYSTEM, METHOD, AND APPARATUS FOR SELF-ADAPTIVE SCHEDULED LIGHTING CONTROL

CROSS-REFERENCE TO RELATED APPLICATIONS

This application claims priority to U.S. Provisional Patent Application No. 62/049,754, filed Sep. 12, 2014 and entitled "System, Method, and Apparatus For Self-Adaptive Scheduled Lighting Control." The foregoing patent application is hereby incorporated by reference into this application in its entirety.

FIELD OF THE INVENTION

This disclosure is directed to lighting control devices. More specifically, this disclosure is directed to self-adaptive scheduled lighting control devices.

BACKGROUND

Until recently, the brightness of electric lights was only controlled by electromechanical means. Specifically, a potentiometer, rheostat, or a special three-position luminaire was used to reduce the power consumption of the light bulb. However, these technologies were designed for, and only worked well with, traditional incandescent bulbs.

Recent developments in lighting technology produced many new lighting products incorporating solid-state technology within the bulb. Compact fluorescent (CFL) bulbs used miniaturized switching power supplies and light-emitting diodes (LEDs) are themselves solid-state electronic devices. Early CFL and LED bulbs were not designed to accommodate the variable voltage supplied by conventional dimmers, and did not work well. Newer CFL and LED bulbs are designed to accommodated conventional dimmers, but the user must still walk across the room and adjust the lights manually.

Simultaneously, developments in expensive wireless technology have produced so-called "smart" LED bulbs, which use integral wireless communications to control the output of the LEDs in the bulb by communicating with a wireless computing device, such as a smartphone or a tablet computer. These smart bulbs allow the user to remotely change the brightness and/or color of their smart LED bulbs, but the technology cannot be used with conventional bulbs. The technology still requires manual intervention by the user when a change is desired, rather than anticipating the user's desire and changing the lighting independently. Accordingly, a need exists for a new self-adaptive scheduled lighting control aimed at overcoming the limitations associated with the prior art solutions.

SUMMARY

A lighting control device is disclosed. The lighting control device includes a microcontroller, at least one wireless transceiver operatively connected to the microcontroller, at least one dimmer operatively connected to the microcontroller, at least one powered lighting output operatively connected to the at least one dimmer, at least one environmental sensor operatively connected to the microcontroller, and at least one input device operatively connected to the microcontroller. The microcontroller is configured to obtain environmental data from the at least one environmental sensor, obtain input data from the at least one input device, transmit the environmental data and the input data to an external server, obtain from the external server a lighting operating schedule based on the environmental data and the input data, execute the lighting operating schedule by controlling one or more smart bulbs via the at least one wireless transceiver and/or controlling the current output to the at least one powered lighting output via the at least one dimmer.

A system is also disclosed for controlling lighting devices. The system includes a lighting control device, an external server, a computing device, and one or more lights. The lighting control device is configured to obtain environmental data from at least one environmental sensor, obtain input data from at least one input device, transmit the environmental data and the input data to the external server, obtain a lighting operating schedule from the external server based on the environmental data and the input data, and execute the lighting operating schedule from the external server. The computing device is configured to obtain user input and transmit the user input to the lighting control device.

A computer-implemented method is also disclosed for controlling illuminating devices. The method includes the steps of: obtaining environmental data from at least one environmental sensor, obtaining input data from at least one input device, transmitting the environmental data and the input data to an external server, obtaining a lighting operating schedule from the external server based on the environmental data and the input data from the external server, executing the lighting schedule by controlling one or more smart bulbs via the at least one wireless transceiver and/or controlling the current output to the at least one powered lighting output via at least one dimmer.

A computer-implemented method is also disclosed for generating a new lighting operating schedule. The method includes the steps of: obtaining environmental data and input data from one or more lighting control devices, weighting the obtained environmental data and input data, and generating a new lighting operating schedule based on a preexisting lighting operating schedule and the environmental data and the input data. The new lighting operating schedule defines the lighting intensity and/or the lighting color for one or more lights as a function of time. The new lighting operating schedule includes a modified version of the preexisting lighting operating schedule which incorporates the weighted environmental data and input data.

DETAILED DESCRIPTION

To facilitate an understanding of the principals and features of the disclosed technology, illustrative embodiments are explained below. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It must also be noted that, as used in the specification and the appended claims, the singular forms "a," "an" and "the" include plural referents unless the context clearly dictates otherwise.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Figure 1:
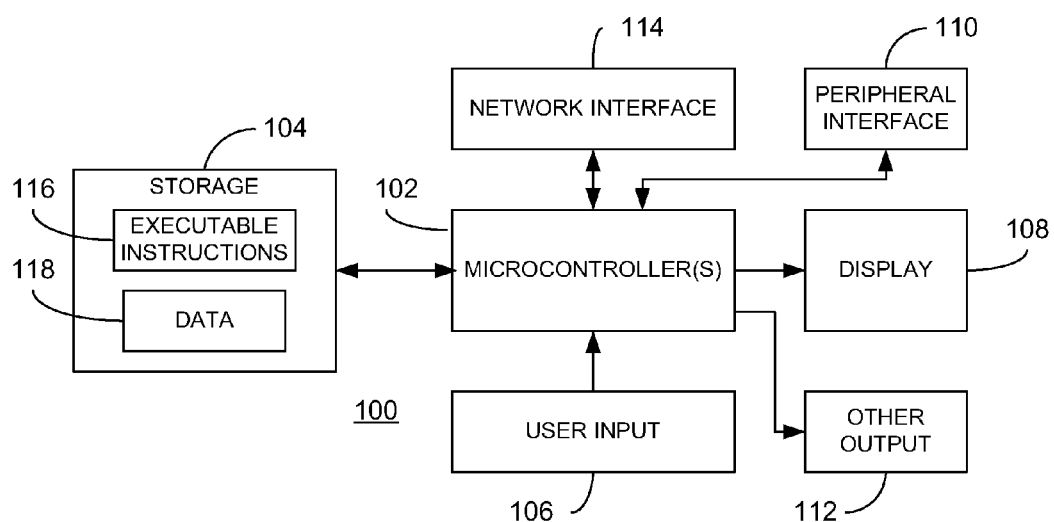
FIG. 1 is a block diagram of an exemplary computing system in accordance with one example of the present disclosure.

Referring now to the Figures, in which like reference numerals represent like parts, various embodiments of the computing devices and methods will be disclosed in detail. FIG. 1 is a block diagram illustrating one example of a computing device 100 suitable for use implementing the methods of scheduled lighting control set forth in this disclosure.

FIG. 1 illustrates a representative computing device 100 that may be used to implement the teachings of the instant disclosure. The computing device 100 may be used to implement, for example, one or more components of the device shown in FIG. 2, as described in greater detail below. The computing device 100 may also be used to implement one or more components of the system shown in FIG. 3. The computing device 100 may also be used to implement some or all of steps of the methods shown in FIGS. 5 and 6.

The computing device 100 includes one or more microcontrollers 102 operatively connected to a storage component 104. The storage component 104, in turn, includes stored executable instructions 116 and data 118. In an embodiment, the microcontroller(s) 102 may include one or more of a microprocessor, microcontroller, digital signal processor, co-processor or the like or combinations thereof capable of executing the stored instructions 116 and operating upon the stored data 118. Likewise, the storage component 104 may include one or more devices such as volatile or nonvolatile memory including but not limited to random access memory (RAM) or read only memory (ROM). Further still, the storage component 104 may be embodied in a variety of forms, such as a hard drive, optical disc drive, floppy disc drive, flash memory, etc. Microcontroller and storage arrangements of the types illustrated in FIG. 1 are well known to those having ordinary skill in the art. In one embodiment, the processing techniques described herein are implemented as a combination of executable instructions and data within the storage component 104.

As shown, the computing device 100 may include one or more user input devices 106, a display 108, a peripheral interface 110, other output devices 112, and a network interface 114 in communication with the microcontroller(s) 102. The user input device 106 may include any mechanism for providing user input to the microcontroller(s) 102. For example, the user input device 106 may include a keyboard, a mouse, a touch screen, microphone and suitable voice recognition application, or any other means whereby a user of the device 100 may provide input data to the microcontroller(s) 102. The display 108 may include any conventional display mechanism such as a cathode ray tube (CRT), flat panel display, or any other display mechanism known to those having ordinary skill in the art. In an embodiment, the display 108, in conjunction with suitable stored instructions 116, may be used to implement a graphical user interface. Implementation of a graphical user interface in this manner is well known to those having ordinary skill in the art. The peripheral interface 110 may include the hardware, firmware and/or software necessary for communication with various peripheral devices, such as media drives (e.g., magnetic disk or optical disk drives), other processing devices, or any other input source used in connection with the instant techniques. Likewise, the other output device(s) 112 may optionally include similar media drive mechanisms, other processing devices, or other output destinations capable of providing information to a user of the device 100, such as speakers, LEDs, tactile outputs, etc. Finally, the network interface 114 may include hardware, firmware, and/or software that allows the microcontroller(s) 102 to communicate with other devices via wired or wireless networks, whether local or wide area, private or public, as known in the art. For example, such networks may include the World Wide Web or Internet, or private enterprise networks, as known in the art.

While the computing device 100 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the device 100 may include a greater or lesser number of components than those illustrated. Once again, those of ordinary skill in the art will appreciate the wide number of variations that may be used is this manner. Further still, although a single computing device 100 is illustrated in FIG. 1, it is understood that a combination of such computing devices may be configured to operate in conjunction (for example, using known networking techniques) to implement the teachings of the instant disclosure.

This disclosure includes systems, devices, and methods of controlling lighting systems, including smart bulbs. As will be understood by persons having ordinary skill in the art, smart bulbs include replaceable, interchangeable lighting devices designed to operate in standard luminaries. Smart bulbs include integral circuitry to control the intensity and/or hue (color) of their light output. Smart bulbs also include circuitry to communicate with one or more control devices. A control device may be a specialized computing device; a generic computing device such as a tablet, smart phone, or personal computer; or a lighting control device as described later in this disclosure. The smart bulbs may communicate with the one or more control devices wirelessly (via WiFi, Bluetooth, ZigBee, or other suitable technology known in the art), via power line carrier signal, or by another means, as understood by those skilled in the art.

This disclosure can also be used to control conventional bulbs. As used in this disclosure "conventional bulbs" may include incandescent bulbs, fluorescent bulbs, LED bulbs, or any other bulbs known to those skilled in the art and not incorporating both the communication and control circuitry attributed to smart bulbs above. In a preferred embodiment, the conventional bulbs controlled are incandescent bulbs, because they are insensitive to power-electronic control techniques such as pulse-width modulation (PWM) and phase-angle controlled thyristors, as will be understood by those skilled in the art. However, persons having ordinary skill in the art will also understand that other embodiments may include known technologies that permit dimming of LED and fluorescent lighting (whether incorporating conventional or solid-state ballasts).

Figure 2:
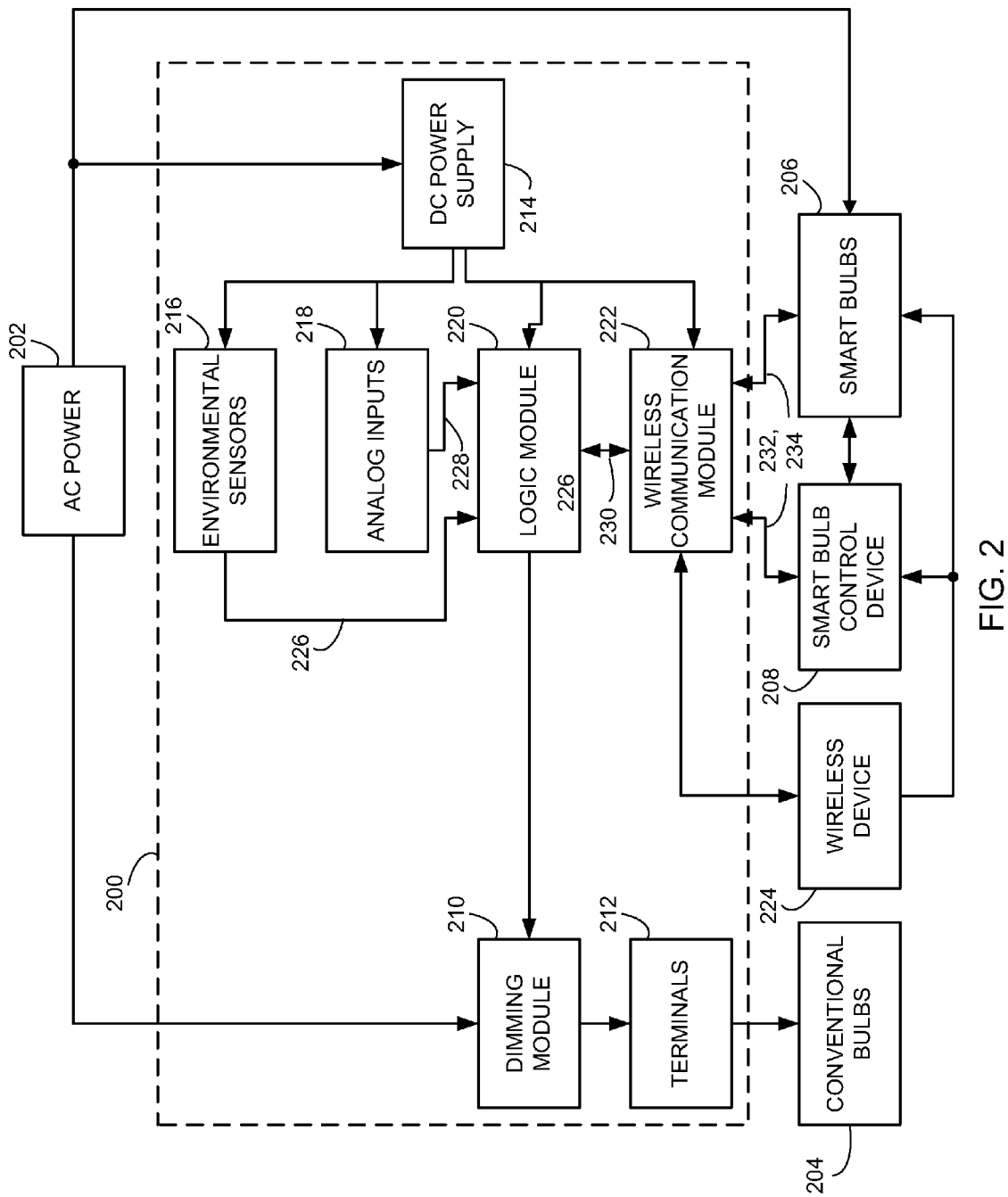
FIG. 2 is a block diagram of an exemplary lighting control device, in accordance one example of with the present disclosure.

FIG. 2 illustrates the functional components of a lighting control device 200 for implementing a user-modifiable lighting schedule. The device 200 is operatively connected to external alternating-current (AC) power 202 and is functionally connected to at least one conventional bulb 204 and/or at least one smart bulb 206, which may be controlled directly by the device 200 or through an intermediary smart-bulb control device 208.

Internally, the device 200 may include power-management components such as a dimmer 210 connected to output terminals 212 and a direct-current (DC) power supply 214. The dimmer 210 and DC power supply 214 are connected to AC power 206. The DC power supply 214 is further connected to and supplies regulated DC power to environmental sensors 216 (if present), analog inputs 218, a logic module 220, and a wireless transceiver 222. The environmental sensors 216, analog inputs 218, and wireless transceiver 222 are operatively connected to the logic module 220. The logic module is also operatively connected to the dimmer 210. The wireless transceiver 222 may also be operatively connected to one or more smart bulbs 206, one or more smart bulb control devices 208, and/or one or more wireless devices 224.

In one embodiment environmental sensors 216 gather environmental data 226 and provide the environmental data 226 to the logic module 220. The environmental sensors 216 may gather data on ambient light, ambient sound, and/or occupancy of a room. The ambient light data may include the intensity of the ambient light and the color of the ambient light. Intensity may be measured in candela, lumens per steradian, or other units, as will be understood by one having ordinary skill in the art. The color of the ambient light may be measured as a combination of primary colors, for example red, green, and blue, or cyan, magenta, and yellow. The color of the ambient light may also be measured as a color temperature, or by another means, as will be understood by one having ordinary skill in the art. Occupancy of a room may be detected by the heat signature of one or more people, the presence or absence of movement in the room, or another technology, as will be understood by those having ordinary skill in the art. For example, in one embodiment, the lighting control may implement a different schedule for a room full of people versus a single person.

The analog inputs 218 gather user input through physical interaction with the device. This analog input data 228 is provided to the logic module 220. The analog input data 228 may be provided by physical interaction with a sliding or rotary dimmer switch, an on/off switch of any of several types, a touch pad, a touch screen, a capacitive touch switch, or any other physical control known to those skilled in the art.

The wireless transceiver 222 gathers digital input data 232 from a wireless device 224. The wireless device may be any computing device capable of wireless communication, including but not limited to the WiFi, Bluetooth, and ZigBee communication protocols. Examples of wireless devices include smartphones, tablets, and notebook computers. The digital input data 232 provides user input regarding the lighting. The digital input data 232 may include commands to turn lights on or off, to change the color of one or more smart bulbs 206, or change the brightness of one or more smart bulbs 206 or conventional bulbs 204. The wireless transceiver 222 also sends commands 234 to the smart bulbs 206 and/or the smart bulb control device 208 to turn lights on or off, the change the color of one or more smart bulbs 206, or change the brightness of one or more smart bulbs 206.

In some embodiments, a user may also be able to communicate directly with either the smart bulbs 206 or the smart bulb control device 208 via a wireless device 224. In these embodiments, the wireless transceiver 222 will also interrogate the smart bulbs 206 and/or the smart bulb control device 208 for their current settings and communicate this information to the logic module 220.

The conventional bulbs 204 are controlled by signals sent from the logic module 220 to the dimmer 210. The dimmer 210 modifies the waveform of the AC power 202 to modify the power delivered to the terminals 212. In one embodiment, the dimmer 210 may, for example, be a triac configured to adjust the closing phase angle of the AC waveform (chopping). In another embodiment, the dimmer 210 may include a pair of opposed transistors implementing PWM. In this embodiment, "transistors" includes bipolar junction transistors (BJTs), field-effect transistors (JFETs, MOSFETs, etc.), insulated-gate bipolar transistors (IGBT) and similar solid-state devices, as understood by those skilled in the art. The dimmer 210 may also include other technologies to modify the power provided to the conventional bulbs 204, as will be understood by those having ordinary skill in the art.

Figure 3:
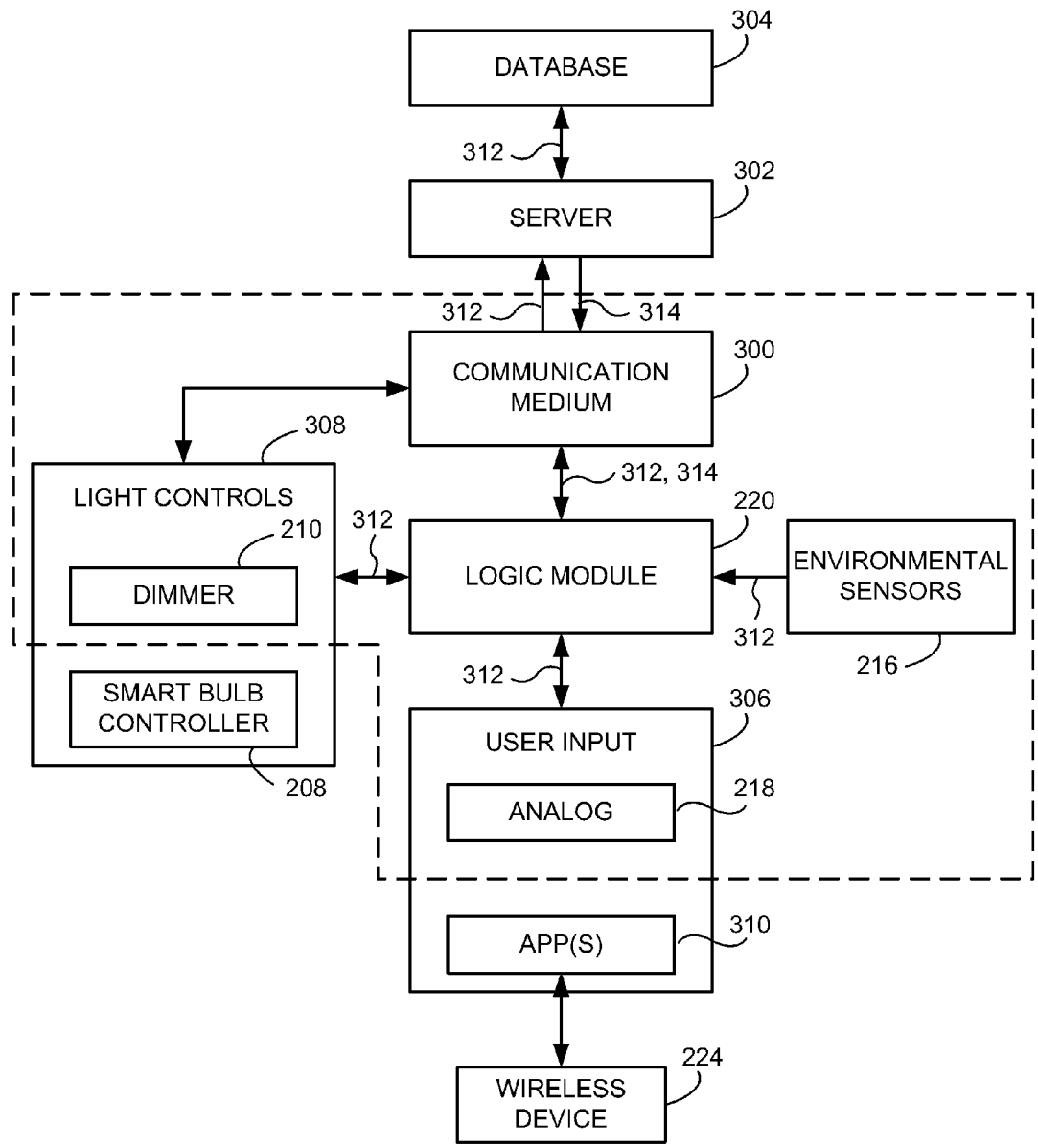
FIG. 3 is a block diagram of an exemplary lighting control system illustrating components involved in the system's data management, in accordance with one example of the present disclosure.

FIG. 3 is a block diagram illustrating components involved in the lighting control system's data management. Other conventional elements of the system such as power circuits are not shown. In one embodiment, the lighting control device 200 includes dimmer 210, environmental sensors 216, analog inputs 218, a logic module 220, and a communication medium 300. The logic module 220 is operatively connected to the lighting controls 308, which may include the dimmer 210, environmental sensors 216; user inputs 306 which may include the analog inputs 218; and the communication medium 300. The communication medium may be a wired or wireless Internet connection, a modem, or any other means of communicating with a remote server, as will be understood by those having ordinary skill in the art. The communication medium 300 is further operatively connected to lighting controls 308 and a server 302. The server is further operatively connected to a database 304. The lighting controls may further include one or more smart bulb control devices 208. The user inputs may further include applications 310 run on one or more wireless devices 224.

The logic module 220 records lighting control data 312 from the environmental sensors 216, the user inputs 306 and the lighting controls 308. This lighting control data is transmitted to the server 302 via the communication medium 300. The server 302 stores the lighting control data 312 in a database 304 and generates a new lighting control schedule 314 for the lighting control device based on the lighting control data 312.

Figure 4:
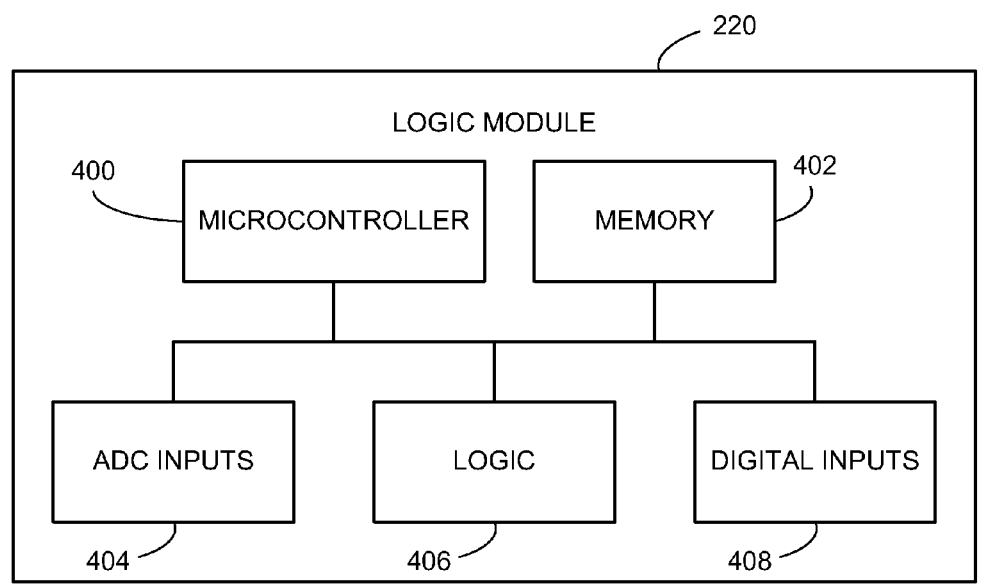
FIG. 4 is a block diagram of an exemplary logic module for FIGS. 2 and 3 illustrating its functional elements, in accordance one example of with the present disclosure.

FIG. 4 is a block diagram illustrating the functional elements of one embodiment of the logic module 220 of FIGS. 2 and 3. As shown, the logic module 220 includes a microcontroller 400, memory 402, analog to digital (ADC) inputs 404, logic 406, and direct digital inputs 408. These functional elements are connected by a data bus 410 or similar internal communication structure, as will be understood by those skilled in the art. In one embodiment, some or all of the functional elements of the logic module 220 may be combined in a single integrated circuit (IC). For example, the microcontroller 400 and logic 406 may be combined in a single IC as with an application-specific integrated circuit (ASIC) or field-programmable gate array (FPGA). The ADC and digital inputs and memory can similarly be integrated into a single IC with the logic 406 and microcontroller 400. An IC can include a multitude of combinations, as will be understood by those having ordinary skill in the art.

In another embodiment, some or all of the components may be discreet components, for example on a printed circuit board assembly (PCBA). In this embodiment, the components may be connected 410 by traces on the PCBA. The memory 402 may be any type of easy to read-and-write non-volatile memory such as flash memory, as known to those skilled in the art. In this embodiment, the logic 406 may be stored within the memory 402, or may be stored in a discreet component, such as an EPROM or EEPROM as "firmware." The ADC input(s) 404 may be a single IC or may include an array of circuit components to condition analog signals and convert them to digital outputs, as understood by those skilled in the art. The digital inputs 408 may be integrated into the microcontroller 400 or may include additional components to condition the digital signals for the microcontroller 400.

Figure 5:
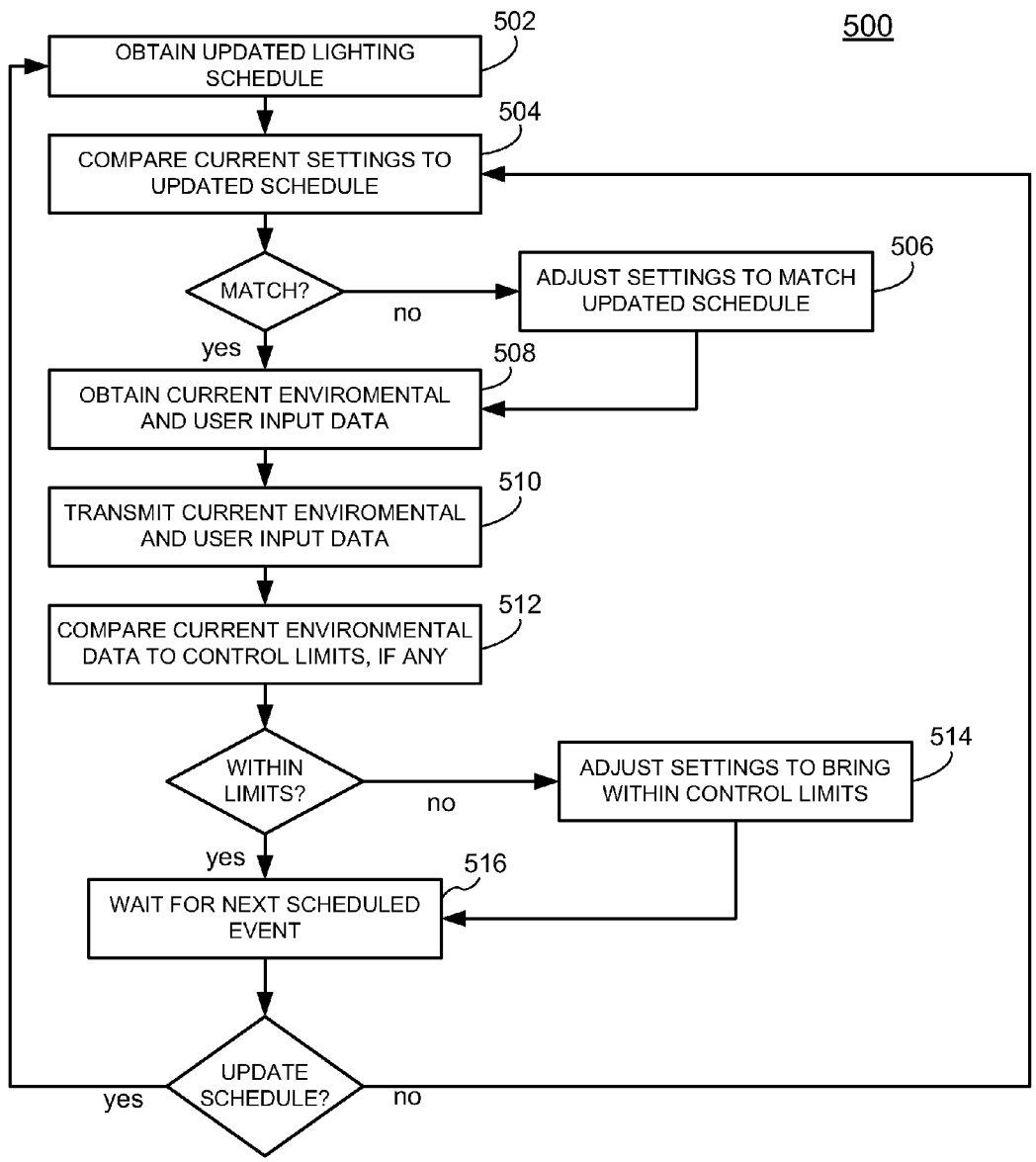
FIG. 5 is a flow chart illustrating exemplary logic for a lighting control device software or firmware, in accordance with one example of the present disclosure.

FIG. 5 illustrates exemplary logic 500 for the lighting control device 200 software or firmware. At 502 the lighting control device 200 obtains an updated lighting schedule from the server. At 504, the updated lighting schedule is compared with the schedule previously stored on the device. At 506, the updated schedule is stored on the device, replacing the previously stored schedule if the schedules are different. At 508, the device obtains current settings for user input data, from both the analog controls on the lighting control device and any digital smart-bulb settings. At 508 the device also obtains measurements from the environmental sensors. At 510, the device transmits the user input data and environmental data to a server. At 512 the device compares the environmental data with the desired environmental conditions defined in the schedule. The desired environmental conditions are defined by upper and lower control limits for particular environmental measurements, such as light intensity and hue/color. At 514 the lighting settings are adjusted, if necessary, to bring the current environmental conditions within the control limits defined by the updated lighting schedule. At 516, the device waits for the next scheduled event. The next scheduled event may be obtaining an updated schedule, in which case the device will do so. Otherwise, the device will return to the monitoring the settings and environmental data, comparing them to the schedule, and making changes as appropriate.

A bulb far away from the sensor will likely have little effect on the sensor's ambient light reading. Such a distant bulb may thus be adjusted from maximum to minimum brightness in response to minor changes in the user's preferred ambient light levels. For example, if the sensor indicates that the room should be brighter, it may increase the distant bulb's brightness by 10%. However, the overall brightness in the room detected by the sensor would be essentially unchanged, so the sensor may again increase the distant bulb's brightness by 10%. Again, the detected brightness in the room remains essentially unchanged. This effect creates an undesirable underdamped feedback loop. The underdamped feedback loop results in distant bulbs always being at either maximum or minimum brightness. The feedback loop can be corrected by calibrating the effect of each bulb on the overall brightness detected by the sensor.

In one embodiment, the device implements a calibration routine during initial setup. This calibration routine brightens and dims each connected bulb and determines its overall effect on the sensor. It then assigns an influence value for the bulb relative to the other bulbs. Thus, a distant bulb which does not directly "see" the sensor would have a low influence value and a nearby bulb directly in front of the sensor would have a high influence value. The device determines the degree to which each bulb should be adjusted based on these influence values.

In another embodiment, the user determines a maximum difference for each bulb between the user's preferred settings and the actual output of the bulb. In another embodiment, the system adjusts each bulb in sequence, one at a time, and then uses the sensor feedback to determine whether or not the cumulative adjustment of all the controlled bulbs has attained the desired effect, then makes further adjustment based on the results.

Figure 6:
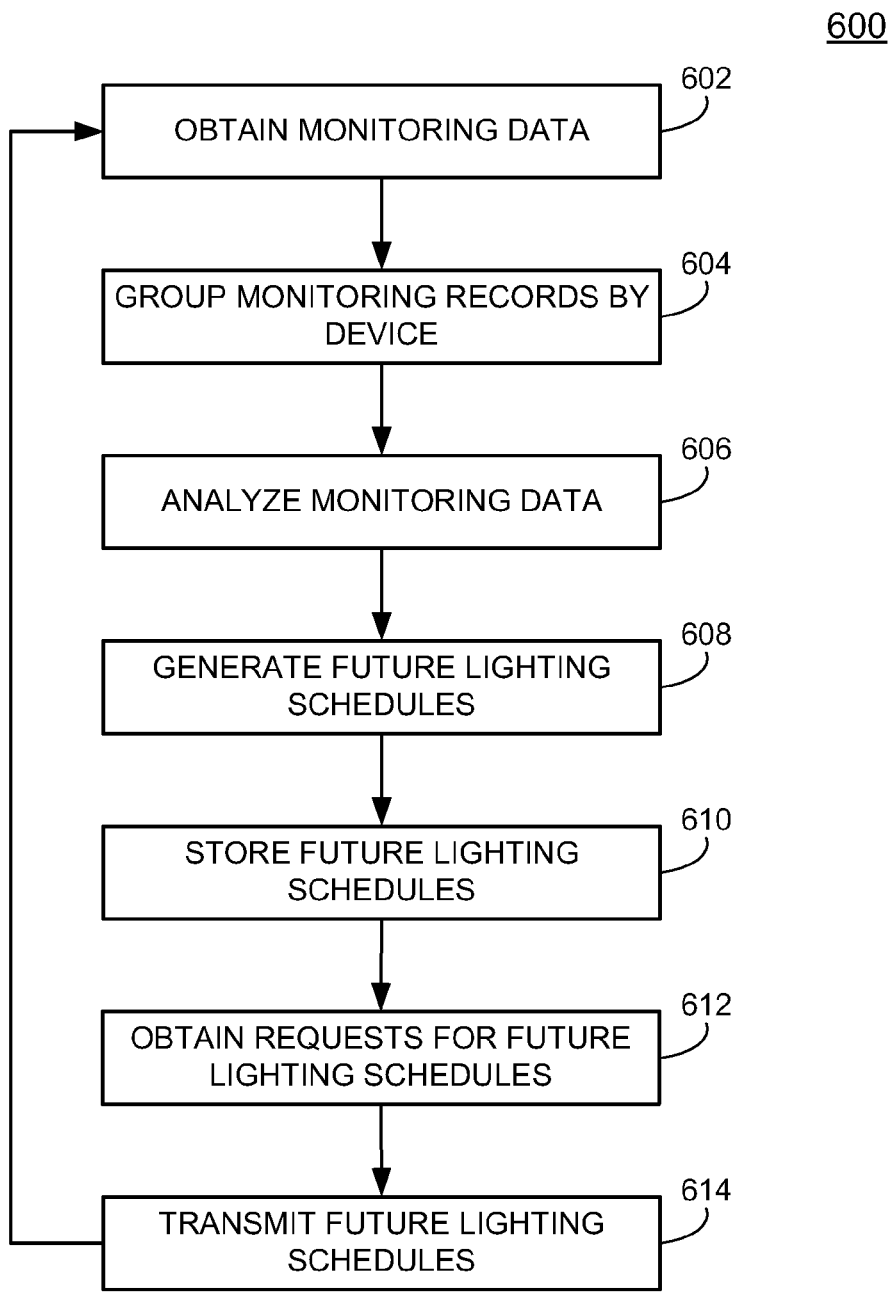
FIG. 6 is a flow chart illustrating exemplary process flow for generating lighting control schedules in a lighting system, in accordance with one example of the present disclosure.

FIG. 6 illustrates an exemplary process flow 600 for generating lighting control schedules in a lighting control system. At 602 the server obtains updated monitoring data from one or more lighting control devices. The monitoring data may include environmental lighting data such as ambient light intensity, hue, etc., as disclosed above. The monitoring data may also include user input data, such as on/off status for individual bulbs, time-out settings, and desired lighting intensity and hue, as disclosed above. At 604 the server sorts all of the monitoring data received from a plurality of lighting control devices into records received from each individual lighting control device. At 606 the server analyzes the records received from each individual lighting control device. The analysis compares new records to previously received data from the lighting control device and to previously transmitted lighting schedules. At 608 the server generates a new lighting schedule for each lighting control device for which new monitoring data is available. The new lighting schedules are based on previously transmitted lighting schedules, previously received monitoring data from the lighting control device, and the newly received monitoring data from the lighting control device. The newly received monitoring data is weighted relative to the previously received monitoring data and the transmitted lighting schedule is modified to more closely reflect the weighted data. At 610 the newly generated lighting schedule is stored in a database. At 612 the server obtains requests for new future lighting schedules. The individual lighting control devices may send the request automatically or the server may "ping" the individual lighting control devices to see if they need new schedules. At 614 the new future lighting schedules are transmitted to the appropriate individual lighting control devices.

Figure 7:
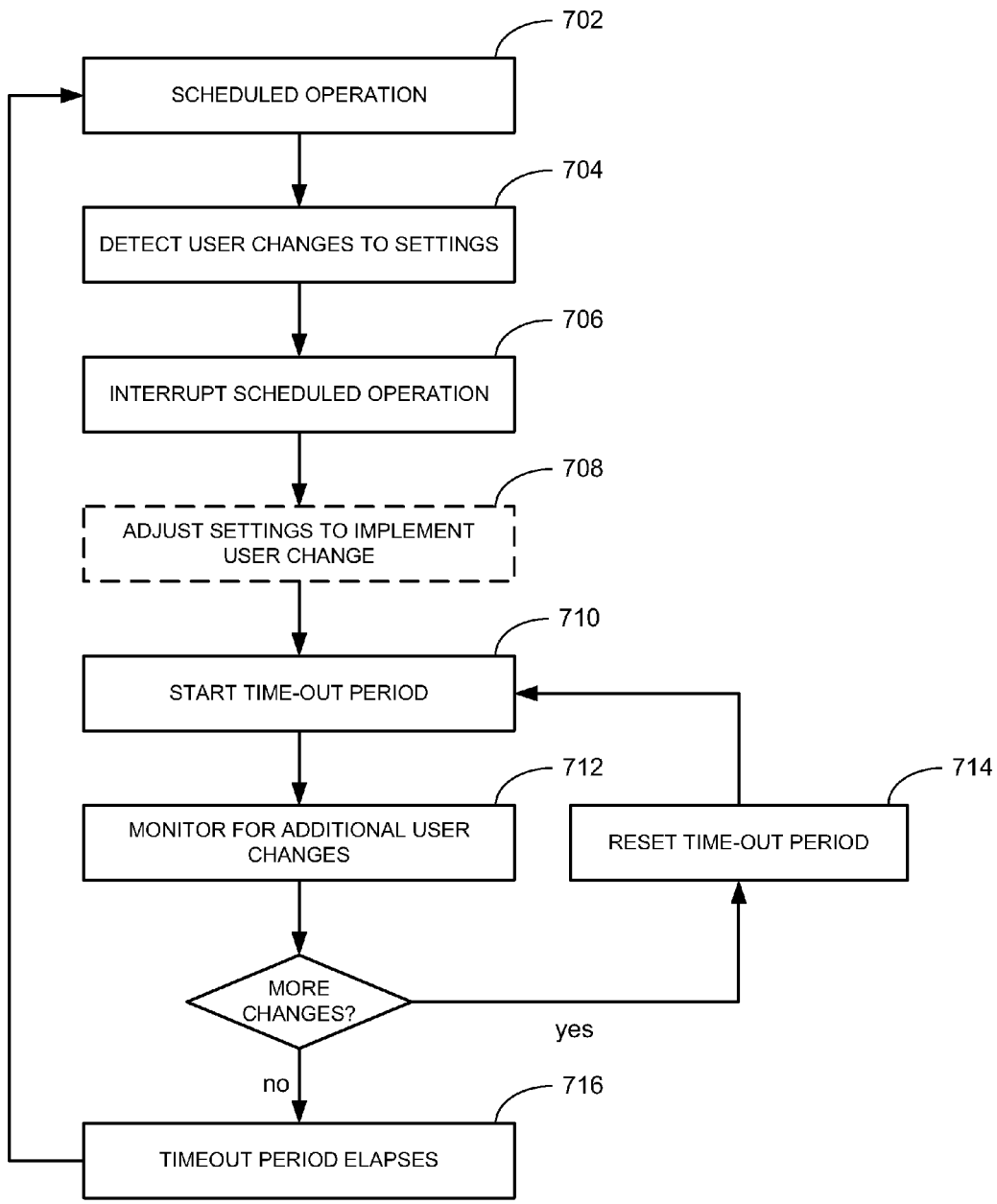
FIG. 7 is a flow chart illustrating exemplary logic for temporarily interrupting the scheduled operation of a lighting control device software or firmware, in accordance with one example of the present disclosure.

FIG. 7 illustrates exemplary logic 700 for temporarily interrupting the scheduled operation of a lighting control device. At 702, the device is operating according to a schedule. At 704, the device detects user changes to the lighting settings. The device may detect changes made directly through physical contact with analog inputs 218 on the device 200, for example a dimmer knob, dimmer slider, or touchscreen. The device 200 may also detect changes made remotely, but requiring direct action by the device. For example, the brightness of conventional bulbs 204 controlled by the device is controlled via a dimmer 210 within the device. If a user changes the brightness of conventional bulbs using an application on a wireless device 224, the device 200 will detect this user change. The device 200 may also detect lighting changes by changes in the environment. Such a change will be registered by the environmental sensors 216. The device may also detect changes by interrogating a smart-bulb control device 208 or by interrogating smart bulbs 206 directly.

At 706, the device interrupts scheduled operation. This means the device will not make scheduled lighting changes until the interruption is canceled. Depending on user settings, the device may also interrupt monitoring functions. This means the device will stop recording environmental data and user changes until the interruption is canceled. At 708, the device may implement the user change. In some embodiments, this step may not be required. It may be required if, for example, the user changed brightness settings using an application on a wireless device. The device may immediately interrupt scheduled operation 706 while the brightness is fine-tuned to implement the user change 708. In some embodiments, such as direct control of the smart bulbs through the wireless device, the user change must be implemented directly by the smart bulbs before the device can detect the change and interrupt the schedule.

At 710, the device starts a timer for fixed time-out period. The period may be a default setting within the device or it may be customized by the user. At 712, the device monitors for additional user changes, which may be detected by any of the method described for step 704. If additional user changes are made before the fixed time-out period elapses, the timer is reset 714 and time-out period begins again 710. If the fixed time-out period elapses without any additional user changes 716, the device returns to scheduled operation 702.

In another embodiment, a user may manually interrupt the scheduled operation and/or the monitoring/recording function for an indefinite time period. Such an "indefinite time-out" basically instructs the device "don't make any changes at all until I say so". Such an "indefinite time-out" may be a specific user setting controlled from within an application on a wireless device. Alternately it might be an adjustable setting using controls on the lighting control device.

The design and functionality described in this application is intended to be exemplary in nature and is not intended to limit the instant disclosure in any way. Those having ordinary skill in the art will appreciate that the teachings of the disclosure may be implemented in a variety of suitable forms, including those forms disclosed herein and additional forms known to those having ordinary skill in the art. For example, one skilled in the art will recognize that executable instructions may be stored on a non-transient, computer-readable storage medium, such that when executed by one or more microcontrollers, causes the one or more microcontrollers to implement the method described above.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a microcontroller, a microcontroller, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments of this technology are described above with reference to block and flow diagrams of computing devices and methods and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a general-purpose computer, a special-purpose computer, a microcontroller, a processor, or other programmable data processing apparatus to produce a particular machine, such that the instructions that execute on the computer, microcontroller, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments of this disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A lighting control device comprising:
   a microcontroller;
   a memory operatively connected to the microcontroller, wherein the memory comprises executable instructions;
   at least one wireless transceiver operatively connected to the microcontroller;
   at least one dimmer operatively connected to the microcontroller;
   at least one powered lighting output operatively connected to the at least one dimmer;
   at least one environmental sensor operatively connected to the microcontroller;
   at least one input device operatively connected to the microcontroller; and
   wherein the microcontroller is configured to execute the executable instructions in order to perform a method comprising:
     obtaining environmental data from the at least one environmental sensor;
     obtaining input data from the at least one input device;
     transmitting the environmental data and the input data to an external server;
     obtaining, from the external server, a lighting operating schedule based on the environmental data and the input data; and
     executing the lighting operating schedule.

2. The lighting control device of claim 1 wherein the environmental data comprises at least one of: an intensity of ambient light, a color of ambient light, an intensity of ambient sound, one or more frequencies of ambient sound, a heat signature indicating the presence or absence of at least one person, and a motion signature indicating the presence or absence of at least one person.

3. The lighting control device of claim 1 wherein the at least one input device comprises at least one of: a wireless computing device, an analog dimmer switch, an analog on-off switch, a touch pad, a touch screen, and a capacitive touch switch.

4. The lighting control device of claim 3 wherein the input data from the at least one input device comprises at least one of: a command to increase ambient light intensity, a command to decrease ambient light intensity, a command to change the color of ambient light, a command to turn one or more individual lights on or off, a command to change a color of one or more individual lights, a command to increase a light intensity of one or more individual lights, and a command to decrease a light intensity of one or more individual lights.

5. The lighting control device of claim 1 wherein the at least one dimmer comprises a plurality of controllable semiconductor devices.

6. The lighting control device of claim 5 wherein the plurality of controllable semiconductor devices control the electrical current output to the at least one powered lighting output via at least one of: adjusting the closing angle of an alternating-current waveform and pulse width modulation.

7. The lighting control device of claim 1 wherein the microcontroller is configured to execute the executable instructions in order to perform the method further comprising:
   comparing the lighting operating schedule obtained from the external server to a currently-executing lighting operating schedule; and
   modifying the currently-executing lighting operating schedule to match the lighting operating schedule obtained from the external server if the lighting operating schedule obtained from the external server is different from the currently-running lighting operating schedule.

8. The lighting control device of claim 1 wherein the microcontroller is configured to execute the executable instructions in order to perform the method further comprising:
   determining if the environmental data from the at least one environmental sensor conforms to at least one environmental control limit; and
   if the environmental data from the at least one environmental sensor does not conform to the at least one environmental control limit, executing lighting commands to cause the environmental data from the at least one environmental sensor to conform to the at least one environmental control limit.

9. The lighting control device of claim 1 wherein the microcontroller is further configured to execute the executable instructions in order to perform the method further comprising implementing a calibration routine during an initial setup.

10. The lighting control device of claim 9 wherein implementing the calibration routine during the initial setup comprises:
    brightening and dimming at least one connected bulb;
    obtaining at least one of additional ambient light intensity and additional ambient light color data from the at least one environmental sensor;

determining an overall effect of the at least one connected bulb on at least one of the ambient light intensity and the color of ambient light based on the additional ambient light intensity and ambient light color data; and
assigning an influence value for the at least one connected bulb.

11. The lighting control device of claim 9 wherein implementing the calibration routine during the initial setup comprises:
individually brightening and dimming each of a plurality of connected bulbs in sequence;
obtaining at least one of additional ambient light intensity and additional ambient light color data from the at least one environmental sensor;
determining an aggregate effect of individually brightening and dimming each of the plurality of connected bulbs based on the additional ambient light intensity and ambient light color data; and
assigning an influence value for each of a plurality of connected bulbs.

12. The lighting control device of claim 10 or 11 wherein the influence value is constrained to a user-selected range.

13. The lighting control device of claim 1 wherein the microcontroller is further configured to execute the executable instructions in order to perform the method further comprising:
detecting a change to at least one user setting;
interrupting execution of the lighting operating schedule based on the detected change to at least one user setting;
initiating an interruption countdown having a fixed duration;
monitoring the at least one input device for an additional change to at least one user setting;
resuming execution of the lighting operating schedule if an additional change to at least one user setting is not detected before the fixed duration of the interruption countdown elapses; and
restarting the interruption countdown if an additional change to at least one user setting is detected before the fixed duration of the interruption countdown elapses.

14. The lighting control device of claim 13 wherein the microcontroller is further configured to execute the executable instructions in order to perform the method further comprising:
executing the change to at least one user setting by at least one of:
controlling one or more smart bulbs via the at least one wireless transceiver, and
controlling the electrical current output to the at least one powered lighting output via the at least one dimmer.

15. A lighting control system comprising:
a microcontroller;
a memory, operatively connected to the microcontroller, wherein the memory comprises executable instructions that when executed by the microcontroller cause the microcontroller to perform a method comprising:
obtaining environmental data from at least one environmental sensor;
obtaining input data from at least one input device;
transmitting the environmental data and the input data to an external server;
obtaining from the external server a lighting operating schedule based on the environmental data and the input data from the external server;
executing the lighting operating schedule from the external server by at least one of:
controlling one or more smart bulbs via at least one wireless transceiver, and
controlling the current output to at least one powered lighting output via at least one dimmer.

16. The lighting control system of claim 15 wherein the method further comprises:
determining if the environmental data from the at least one environmental sensor is within at least one environmental control limit; and
if the environmental data from the at least one environmental sensor does not conform to the at least one environmental control limit, executing lighting commands to cause the environmental data from the at least one environmental sensor to conform to the at least one environmental control limit.

17. The lighting control system of claim 15 wherein the method further comprises implementing a calibration routine during an initial setup.

18. The lighting control device of claim 17 wherein the calibration routine:
brightens and dims at least one connected bulb;
obtains at least one of additional ambient light intensity and additional ambient light color data from the at least one environmental sensor;
determines an overall effect of the at least one connected bulb on at least one of the ambient light intensity and the color of ambient light based on the additional ambient light intensity and ambient light color data; and
assigns an influence value for the at least one connected bulb.

19. The lighting control device of claim 17 wherein the calibration routine:
individually brightens and dims each of a plurality of connected bulbs in sequence;
obtains at least one of additional ambient light intensity and additional ambient light color data from the at least one environmental sensor;
determines an aggregate effect of individually brightening and dimming each of the plurality of connected bulbs based on the additional ambient light intensity and ambient light color data; and
assigns an influence value for each of a plurality of connected bulbs.

20. A computer system comprising:
a processor;
a memory, operatively connected to the processor, wherein the memory comprises executable instructions that when executed by the processor cause the processor to perform a method comprising:
obtaining environmental data and input data from at least one lighting control device;
weighting the obtained environmental data and input data;
generating a new lighting operating schedule based on a preexisting lighting operating schedule and the environmental data and the input data, wherein the new lighting operating schedule defines at least one of a lighting intensity and a lighting color for one or more lights as a function of time; and
wherein the new lighting operating schedule comprises a preexisting lighting operating schedule modified to incorporate the weighted environmental data and input data.

* * * * *